Figure 1:
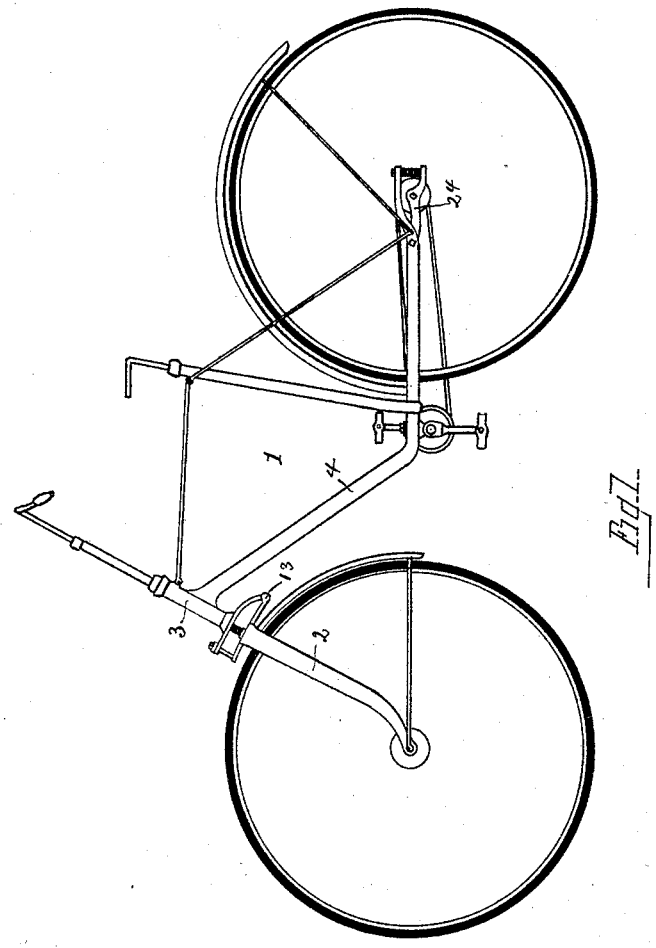

(No Model.)
2 Sheets—Sheet 1.

O. HANSON.
BICYCLE.

No. 482,735.  Patented Sept. 20, 1892.

WITNESSES
Carrie J. Webster.
Gertrude Gifford.

INVENTOR
Olaus Hanson
By Myers & Webster
Attys

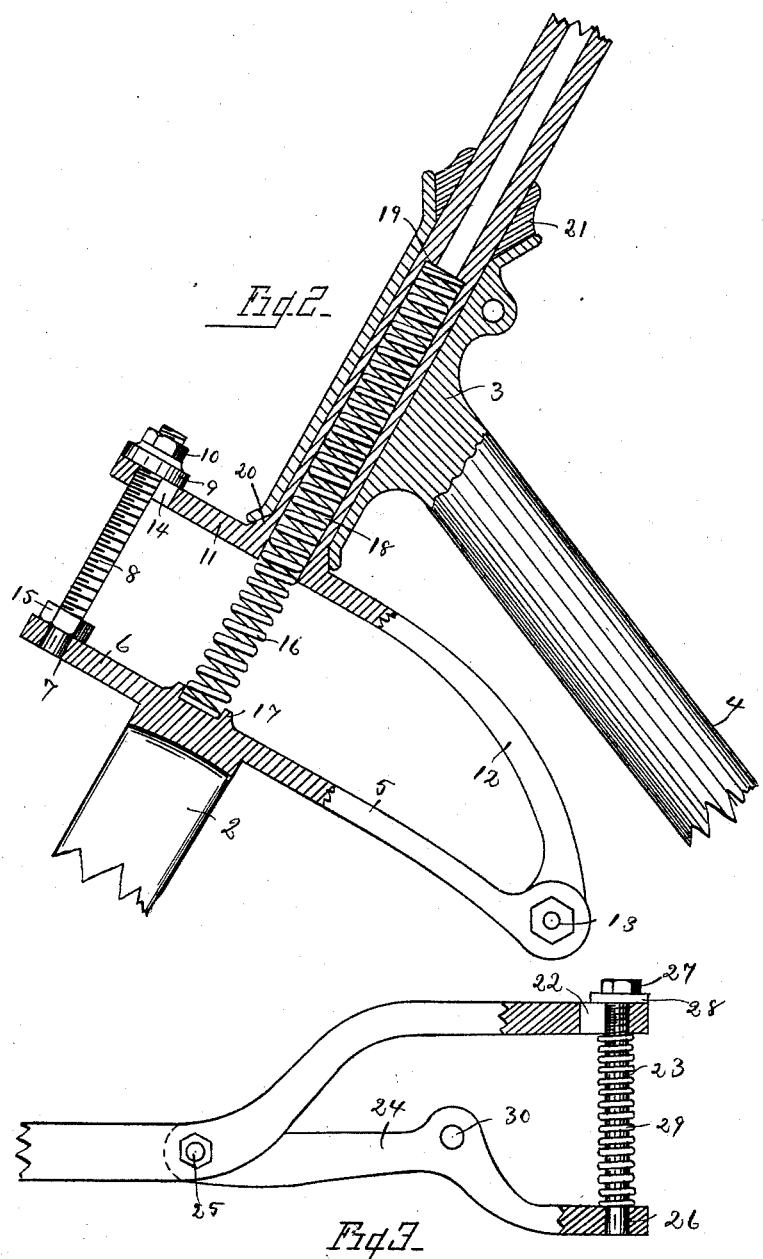

UNITED STATES PATENT OFFICE.

OLAUS HANSON, OF TOLEDO, OHIO.

BICYCLE.

SPECIFICATION forming part of Letters Patent No. 482,735, dated September 20, 1892.

Application filed December 8, 1890. Serial No. 373,936. (No model.)

*To all whom it may concern:*

Be it known that I, OLAUS HANSON, of Toledo, county of Lucas, and State of Ohio, have invented certain new and useful Improvements in a Spring-Fork and Spring-Frame for Bicycles; and I do hereby declare that the following is a full, clear, and exact description of the invention, which will enable others skilled in the art to which it appertains to make and use the same, reference being had to the accompanying drawings, and to the figures of reference marked thereon, which form part of this specification.

My invention relates to a spring-fork and spring-frame for bicycles, and has for its object to provide means for preventing jar to the seat or steering-head, due to an impact of the wheel with any uneven surface.

A further object is to construct a frame in which there shall be an interposed yielding connection between the front fork and steering-head and a like connection between the rear fork and axle.

A further object is to provide an interposed yielding connection for the front fork, with means for rendering the same rigid, if desired.

The invention consists in the parts and combination of parts hereinafter described, and pointed out in the claims.

In the drawings, Figure 1 is a side elevation of a Safety bicycle provided with my improved yielding connections. Fig. 2 is a detail view of a portion of the fork with the steering-head sleeved thereon, and also showing the interposed yielding connection in position, a portion of the parts being in section to disclose their relative positions. Fig. 3 is a detail view of a portion of the rear fork and yielding connection.

As my invention is more particularly adapted to that class of bicycle known as "Safety," bicycle, I will describe it as attached thereto. As is well known, the present demand is for a bicycle having a minimum weight commensurate with sufficient strength. In order to construct a frame of light weight and neat appearance, the frame must of necessity respond to any jar or impact of the wheel with an obstacle. This jar is communicated to the seat, and consequently to the rider, and also to the fork and handle-bar, causing an uncomfortable sensation to the body and arms of the rider. I have overcome these objections by providing an interposed yielding connection between the fork and handle-bar, preferably between the fork and steering-head, and also a yielding connection between the axle of the hind wheel and the frame.

1 designates the bicycle, 2 the fork, 3 the steering-head, and 4 the backbone. At a point above the bifurcated portion of the fork and preferably below the steering-head is interposed my improved spring connection, comprising a plate 5, rigidly secured to the fork and extending some distance in front and in rear of the same. The forward-projecting portion 6 of plate 5 is perforated, as at 7, to receive a pin 8, upon the upper end of which is a washer 9 and nut 10, which bear upon the upper side of a plate 11, connected, preferably, integrally with the upper portion of the fork-post. Plate 11 is formed with a downwardly-curved rear portion 12, and is connected with plate 5 by a hinge-joint 13, the opposite end of the plate being of a length to project beyond the fork-post an equal length with projection 6 of plate 5, and is formed with an elongated opening 14, through which the pin 8 passes, as has been heretofore described. Pin 8 is securely fastened in plate 5, and is preferably screw-threaded its entire length to receive a nut 15, the purpose of the nut being to enable the rider to run the same upon the pin until it bears against the under side of plate 11 when it is desired to make the connection rigid, if it should be so desired, at any time.

16 designates a spiral spring resting at the lower end in a hollow boss 17, the upper end of which is incased by an integral tubular extension carried by the plate 12 and working in an opening 18, formed longitudinally of the fork-post, the opening terminating in a contracted portion forming shoulders 19, against which the upper end of the spring rests. The upper side of plate 11 is formed with a cone-bearing 20, upon which the lower conical open end of the steering-head rests, and is held in place by a conical nut 21, bearing upon the upper end thereof. The rear fork of the frame is curved upwardly and formed with an elongated perforation 22 to receive a pin 23, which is free to pass through the perforation, as will be more fully described.

24 designates a bar pivotally secured to the fork, one being secured to each prong, as at 25, and perforated at the outer end at 26 to receive the lower end of pin 23, which is firmly secured therein. The bar is held to the limit of its downward movement by a nut 27, screwed upon its upper end and bearing upon a washer 28, which rests upon the upper side of the frame.

29 designates a coiled spring encircling the pin 23 and bearing upon the under side of frame 4 and the upper side of bar 24, thereby separating the parts by the tension of the spring. Bar 24 is perforated at 30 to receive the axle of the rear wheel, which is journaled therein.

From the above description the operation will be apparent. Should the front wheel contact with an obstruction, the jar, which has heretofore been communicated to the fork and from thence to the frame and seat, and consequently to the rider, is received by the spring 16 and communicated to the plate 5, which yields as the spring is compressed, causing the pin 8 to pass through perforations 14 in plate 11, and in this manner the effect of the jar is entirely removed from the frame or the handle-bar. The operation of the rear spring is similar to that just described, as should the rear wheel meet with an obstruction the bar 24 receives the jar and is free to rise against the tension of spring 29, the pin 23 passing upward a sufficient distance through perforation 22, by which means the frame is relieved of all jar. It will be seen that the spring attachments are simple in construction and positive in operation.

While I have shown and described a preferred form of plate and spring attachment, I wish it understood that I may vary the construction widely without departing from the spirit of my invention—as, for instance, in the front fork attachment I may dispense with spring 16 and place a like spring upon the outer ends of the plates and surrounding pin 8, or I may form the fork-post of two parts, one of which shall telescopically fit over the other and contain a spring interposed between the two, these modifications being within the scope of my invention.

What I claim is—

1. In a bicycle, a fork-post having a plate rigidly secured thereon, a steering-head, a plate pivotally connected with the plate of the fork-post, having an integral tubular extension working in the steering-head, a spring mounted in the said extension and bearing at its lower end on the plate of the fork-post, and a threaded bolt engaging the free ends of the plates.

2. In a bicycle, a fork-post, a plate rigidly secured thereon having a hollow boss on its upper face, a steering-head, the upper and the lower ends of which are flared, a plate pivotally connected with the plate of the fork-post and having an integral tubular extension working in the steering-head, said extension having conical bearings engaging the flared ends of the steering-head, a spring mounted in the extension and bearing at its lower end in the said hollow boss, and a threaded bolt engaging the free ends of the plates.

In testimony that I claim the foregoing as my own I hereby affix my signature in presence of two witnesses.

OLAUS HANSON.

Witnesses:
WILLIAM WEBSTER,
CHARLES J. MOORE.